(12) United States Patent  
Yang

(10) Patent No.: US 7,864,511 B2  
(45) Date of Patent: Jan. 4, 2011

(54) COVER ASSEMBLY FOR ELECTRONIC DEVICE

(75) Inventor: Wen-Yan Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 10 days.

(21) Appl. No.: 12/503,849

(22) Filed: Jul. 16, 2009

(65) Prior Publication Data

US 2010/0238613 A1 Sep. 23, 2010

(30) Foreign Application Priority Data

Mar. 17, 2009 (CN) .......................... 2009 1 0300917

(51) Int. Cl.  
*H05K 5/00* (2006.01)  
*H05K 7/00* (2006.01)

(52) U.S. Cl. ............................. 361/679.01; 361/679.02

(58) Field of Classification Search ............ 361/679.01, 361/679.02, 679.1, 679.18, 679.19, 679.4, 361/679.57

See application file for complete search history.

(56) References Cited

U.S. PATENT DOCUMENTS

| | | | | |
|---|---|---|---|---|
| 6,262,716 B1 * | 7/2001 | Raasch | .................. | 345/168 |
| 6,489,947 B2 * | 12/2002 | Hesley et al. | .............. | 345/163 |
| 6,887,005 B2 * | 5/2005 | Kim | .................... | 400/715 |
| 7,697,269 B2 * | 4/2010 | Yang et al. | .............. | 361/679.01 |
| 2005/0180099 A1 * | 8/2005 | Lin et al. | ................... | 361/683 |
| 2009/0291722 A1 * | 11/2009 | Li et al. | .................. | 455/575.4 |

* cited by examiner

*Primary Examiner*—Jayprakash N Gandhi  
*Assistant Examiner*—Anthony M Haughton  
(74) *Attorney, Agent, or Firm*—Frank R. Niranjan

(57) ABSTRACT

A cover assembly includes a housing plate and a cover. The housing plate includes a first wall, a second wall, a third wall, and a fourth wall. The housing plate defines a rectangular opening. The first, second, third, and fourth walls are formed at the four edges of the rectangular opening. The housing plate defines a first positioning slot in the first wall, two second positioning slots at one end of the second wall and the third wall adjacent to the first wall, and a third positioning slot at a side of the rectangular opening. The cover includes a front end, an opposite rear end, a first locking sheet on the middle of the front end, two second locking sheets on both sides of the front end, and two third locking sheets on the inner surface of the disassembly portion and protruding from the rear end to the front end.

10 Claims, 4 Drawing Sheets

COVER ASSEMBLY FOR ELECTRONIC DEVICE

BACKGROUND

1. Technical Field

The present disclosure relates to cover assemblies and, particularly, to a battery cover assembly for use in an electronic device.

2. Description of Related Art

Battery covers are used to secure batteries in electronic devices. At present, when most battery covers are in the closed state, the battery covers are typically engaged with the housing of the electronic device by screws. Thus, it is inconvenient or inefficient to close and/or open the battery covers using screws.

What is needed, therefore, is a cover assembly to overcome the above mentioned problems.

DETAILED DESCRIPTION

Figure 1:
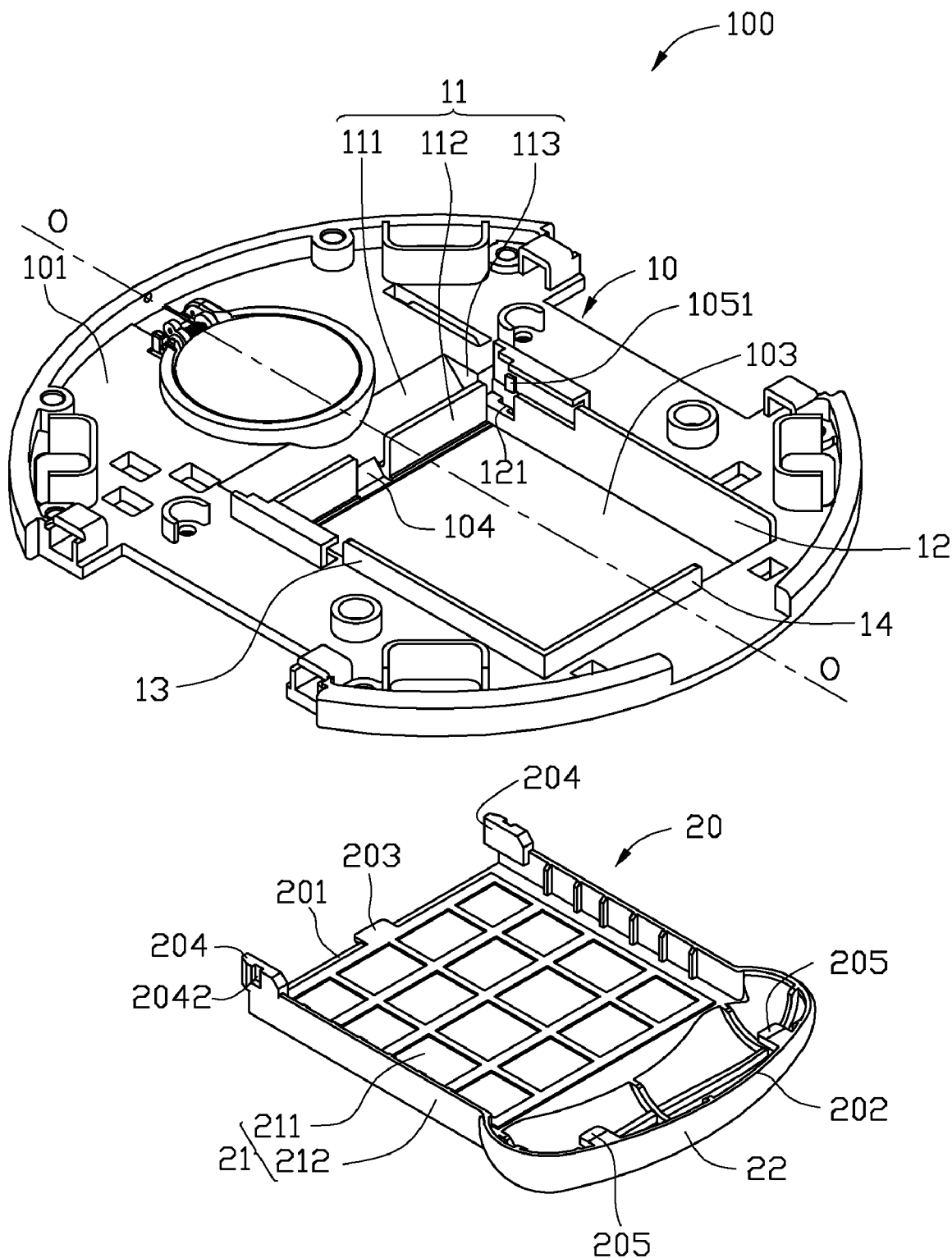
FIG. 1 is an isometric schematic view of a cover assembly, according to an exemplary embodiment of the disclosure.
Figure 2:
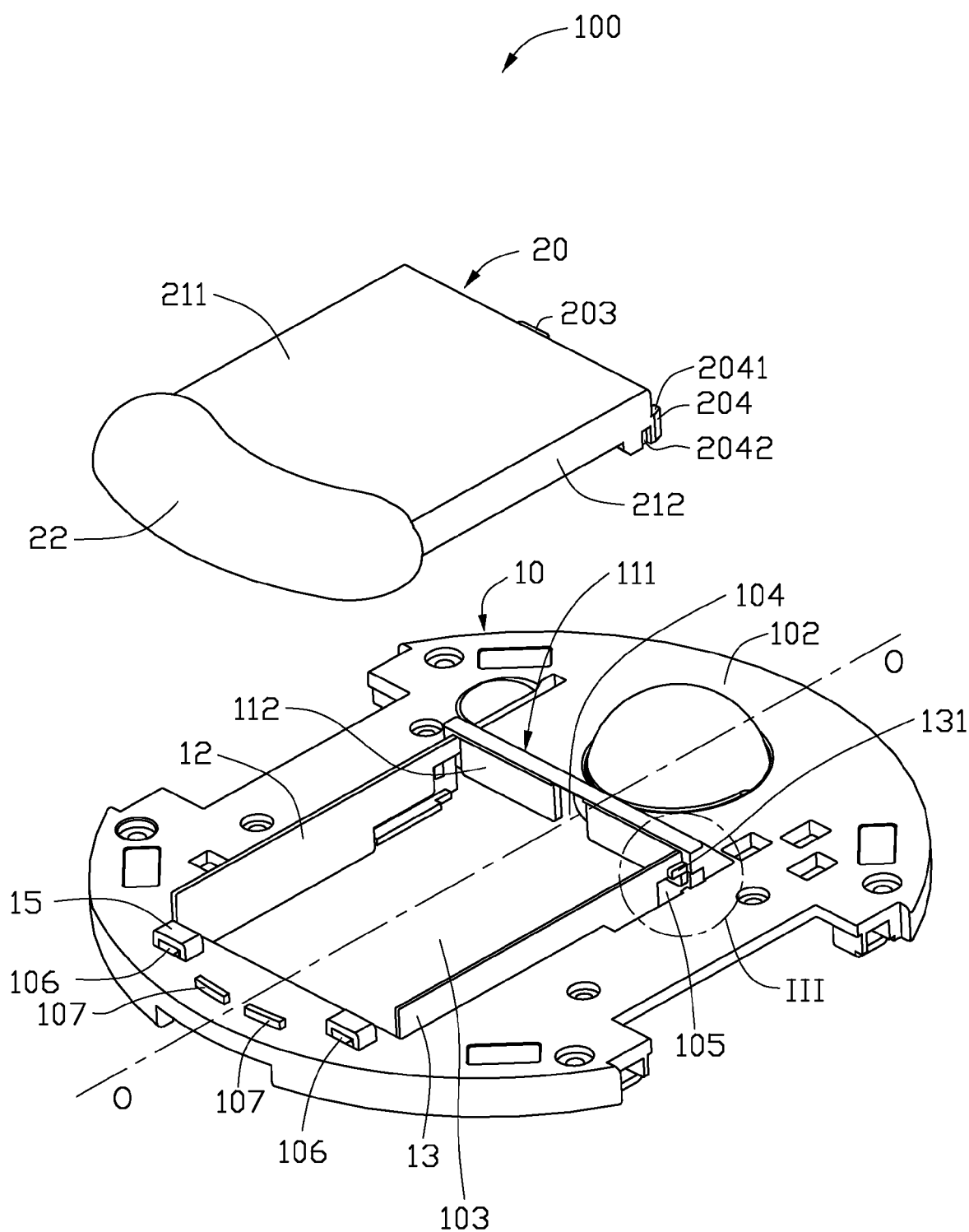
FIG. 2 is the same structure as FIG. 1, but viewed at another angle.

Referring to FIGS. 1-2, a cover assembly 100 for use in an electronic device (not shown), according to an exemplary embodiment, is shown. The cover assembly 100 includes a housing plate 10 and a cover 20.

In this embodiment, the housing plate 10 is the bottom plate of the electronic device and includes an inner surface 101 and an outer surface 102.

The housing plate 10 defines a rectangular opening 103 through the outer surface 102 and the inner surface 101 to allow detachable components of the electronic device, e.g., batteries, to be inserted into and removed from the electronic device. The housing plate 10 includes a first wall 11, a second wall 12, a third wall 13, and a fourth wall 14. The first wall 11, the second wall 12, the third wall 13, and the fourth wall 14 are formed at the four edges of the rectangular opening 103.

The first wall 11 includes a sloping wall 111, an upright wall 112, and two side walls 113. The sloping wall 111 slopes up from the inner surface 101 to the outer surface 102 at an angle with respect to the outer surface 102 (or the inner surface 101) from a corresponding edge of the rectangular opening 103. The upright wall 112 extends towards the inside of the electronic device from the outer surface 102 to the inner surface 101 from the distal end of the sloping wall 111 and is substantially perpendicular to the inner surface 101. The side walls 113 connect the two sides of the upright wall 112 and the slope wall 111 correspondingly. The upright wall 112 defines a first rectangular positioning slot 104 in the middle portion.

Figure 3:
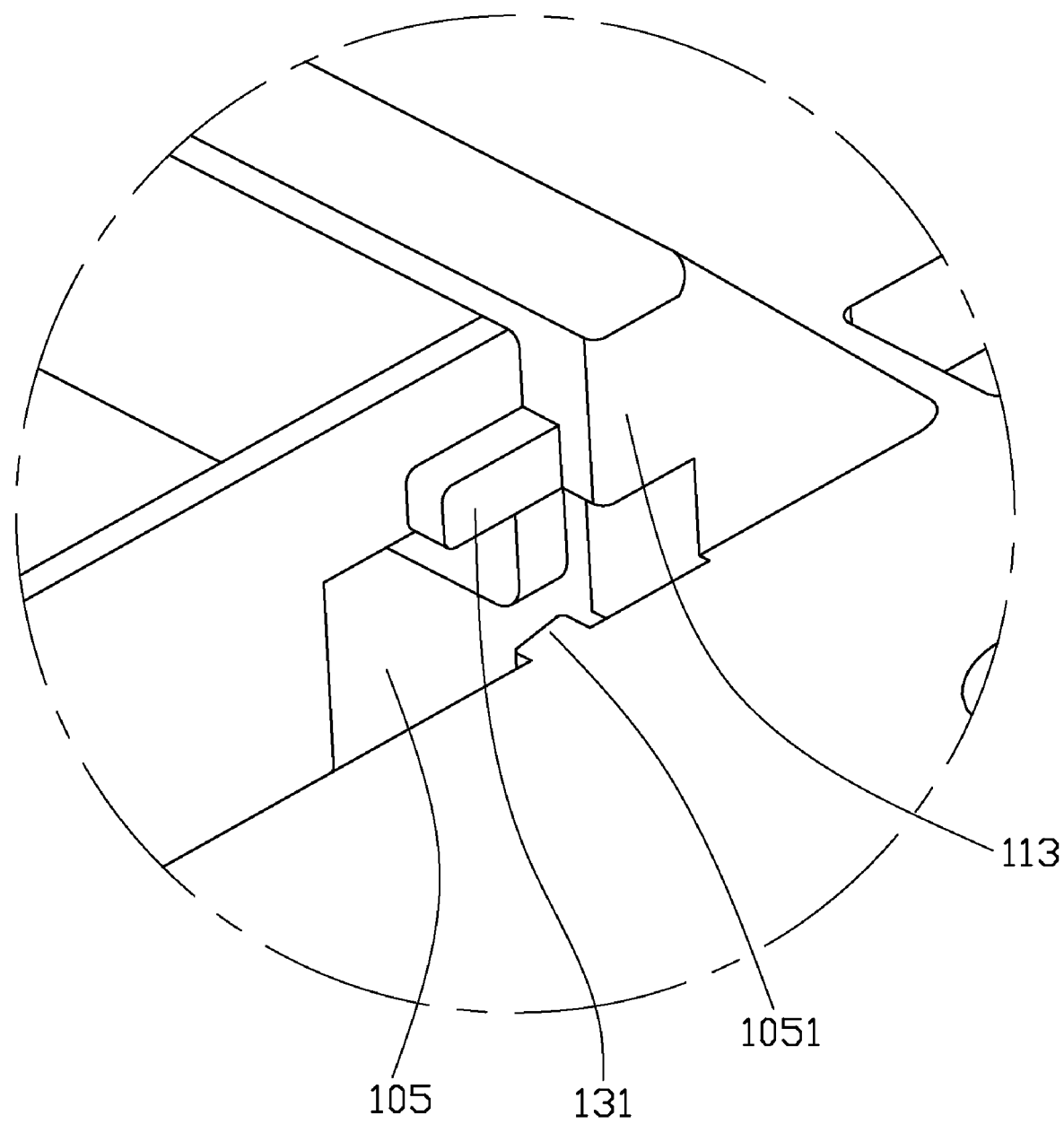
FIG. 3 is a partial enlarged view of III of FIG. 2.

The housing plate 10 defines two second positioning slots 105. The two second positioning slots 105 are correspondingly formed in an end of the second wall 12 and the third wall 13 adjacent to the first wall 11 and symmetric about a central axis O-O of the housing plate 10. Also referring to FIG. 3, each of the second wall 12 and the third wall 13 includes a restricting block 121, 131. The two restricting blocks 121, 131 are positioned at a side of the second positioning slot 105 away from the outer surface 102. The housing plate 10 includes an engaging member 1051 formed on a side of each second positioning slot 105 and protruding to the rectangular opening 103. The protruding length of the engaging member 1051 gradually increases from the direction of the fourth wall 14 to the direction of the first wall 11.

The housing plate 10 includes two clasp members 15 formed on the outer surface 102. The clasp members 15 are U-shape. Each of the clasp members 15 and the surface of the housing plate 10 cooperatively define a third positioning slot 106 therein.

The housing plate 10 further includes two curved flanges 107 fixed on the outer surface 102 and positioned between the clasp members 15. The arch of the curved flanges 107 points away from the fourth wall 14. The clasp members 15 and the flanges 107 are symmetric with each other about the central axis O-O of the housing plate 10.

The cover 20 includes a front end 201 and a rear end 202 on another side of the cover 20 opposite to the front end 201. The cover 20 further includes a covering portion 21 and a disassembly portion 22 integrally connected to the covering portion 21 and positioned at the rear end 202 of the cover 20. The covering portion 21 includes a rectangular top plate 211 and two side plates 212 extending substantially perpendicular from two long edges of the rectangular top plate 211 correspondingly. The top plate 211 includes a first locking sheet 203. The first locking sheet 203 is rectangular shaped and formed on the middle of front end 201. Each of the side plates 212 includes a second locking sheet 204 formed on the front end 201. Each of the second locking sheets 204 includes a top surface 2041 parallel to the top plate 211. Each of the second locking sheets 204 defines a trough 2042 in the outer surface. The length-wise direction of the trough 2042 is perpendicular to the top plate 211. The disassembly portion 22 is a curved plate; the outer surface of the disassembly portion 22 is generally a curve in shape. The disassembly portion 22 includes two third locking sheets 205 formed on the inner surface of the disassembly portion 22 and protruding from the rear end 201 to the front end 202.

Figure 4:
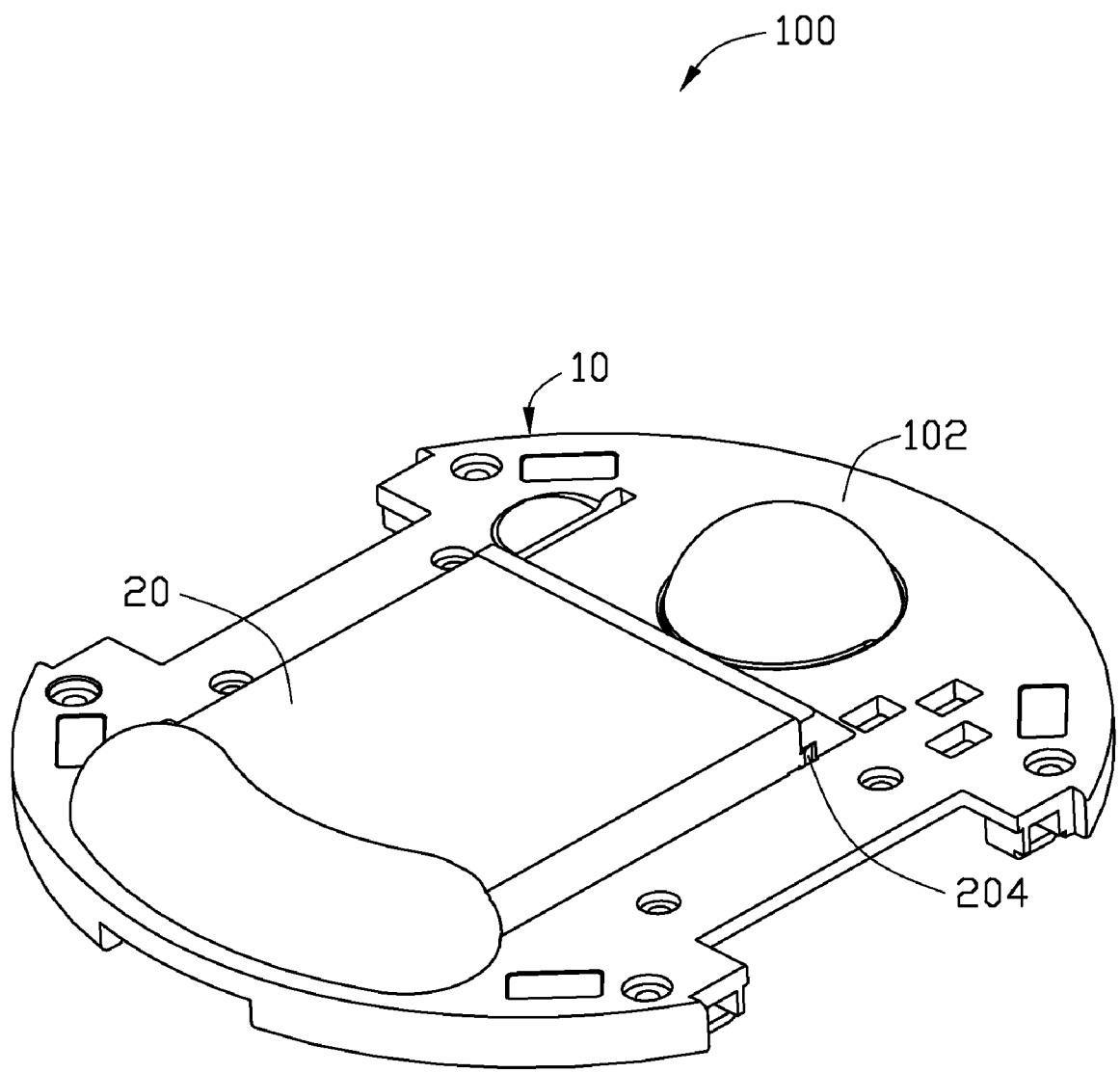
FIG. 4 is an assembled view of the FIG. 2.

Referring also to FIG. 4, when covering the opening, the cover 20 is positioned on the outer surface 102 and covers the rectangular opening 103. The front end 201 of the cover 20 is attached to the first wall 11 of the housing plate 10. The first locking sheet 203 is inserted into the first positioning slot 104. The two second locking sheet 204 are correspondingly inserted into the second positioning slots 105. The top surfaces 2041 of the second locking sheets 204 are restricted by the restricting blocks 121, 131. The two engaging members 1051 are correspondingly engaged in the troughs 2042. The two third locking sheets 205 are correspondingly inserted into the third positioning slots 106. The restricting blocks 121, 131 and the clasp members 15 are used for restricting the movement of the cover 20 in the direction perpendicular to the surface of the housing plate 10. The engaging members 1051 and the flanges 107 are used for restricting the movement of the cover 20 in the direction parallel to the surface of the housing plate 10.

When uncovering the opening, the two second locking sheets 204 are close to each other by pressing the two second locking sheets 204 toward each other, then the engaging members 1051 can be disengaged from the troughs 2042 respectively. The disassembly portion 22 is pushed to the rear end 202 in the direction of the cover 20, then the first locking sheet 203, the second locking sheets 204, and the third locking sheets 205 can be pulled out from the first positioning slot 104, the second positioning slots 105, and the third positioning slots 106 respectively. Finally, the cover 20 is disassembled.

Being such structured, the housing and the cover can be steadily assembly together and easily disassembly from each other.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A cover assembly for an electronic device, the cover assembly comprising:
    a housing plate comprising an inner surface, an outer surface, a first wall, a second wall, a third wall, and a fourth wall, the housing plate defining a rectangular opening through the outer surface and the inner surface, the first wall, the second wall, the third wall, and the fourth wall being formed at the four edges of the rectangular opening, the housing plate defining a first positioning slot in the first wall, two second positioning slots in an end of the second wall and the third wall adjacent to the first wall, and a third positioning slot at a side of the rectangular opening near the fourth wall; and
    a cover comprising a front end, a rear end opposite to the front end, a first locking sheet formed on the middle of the front end, two second locking sheets formed on both sides of the front end, and two third locking sheets formed on the inner surface of the rear end of the cover and protruding from the rear end to the front end;
wherein the cover is connected to the housing plate via the first, second, and third locking sheets, and the first, second, and third locking sheets are correspondingly inserted into the first, second, and third positioning slots for restricting the motion of the cover in the directions perpendicular and parallel to the surface of the housing plate.

2. The cover assembly as claimed in claim 1, wherein the first wall comprises a sloping wall, an upright wall, and two side walls, the sloping wall slopes up at an angle with respect to the inner surface from a corresponding edge of the rectangular opening, and the upright wall extends towards the inside of the electronic device from the distal end of the sloping wall and is substantially perpendicular to the inner surface of the housing plate.

3. The cover assembly as claimed in claim 1, wherein each of the second wall and the third wall comprises a restricting block, the two restricting blocks being correspondingly positioned on a side of the second positioning slot away from the surface of the housing plate.

4. The cover assembly as claimed in claim 1, wherein the housing plate comprises an engaging member formed on a side of the second positioning slot and protruding to the rectangular opening, and the protruding length of the engaging member gradually increases from the direction of the fourth wall to the direction of the first wall.

5. The cover assembly as claimed in claim 1, wherein the housing plate comprises two clasp members formed on the outer surface thereof, the clasp member is bended as U-shape, and each of the clasp members and the surface of the housing plate cooperatively define the third positioning slot therein.

6. The cover assembly as claimed in claim 5, wherein the housing plate further comprises two curved flanges fixed on the outer surface and positioned between the two clasp members, and the arch of the curved flanges points away from the fourth wall.

7. The cover assembly as claimed in claim 6, wherein the cover comprises a covering portion and a disassembly portion integrally connected to the covering portion and positioned at the rear end of the cover.

8. The cover assembly as claimed in claim 7, wherein the covering portion comprises a rectangular top plate and two side plates extending substantially perpendicular from two long edges of the rectangular top plate correspondingly, the first locking sheet being formed on the middle of the front end of the top plate, the second locking sheets being correspondingly formed on the front ends of the two side plates.

9. The cover assembly as claimed in claim 8, wherein each of the second positioning sheets defines a trough in the outer surface, and the length-wise direction of the trough is perpendicular to the top plate.

10. The cover assembly as claimed in claim 7, wherein the disassembly portion is a curve-shaped plate, the outer surface of the disassembly portion is a curve-shape, and the two third locking sheets are formed on the inner surface of the disassembly portion and protruding from the rear end to the front end.

* * * * *